(12) United States Patent
Guo et al.

(10) Patent No.: US 11,926,564 B2
(45) Date of Patent: *Mar. 12, 2024

(54) TRANSITION METAL-CONTAINING, ION EXCHANGEABLE COLORED GLASSES

(71) Applicant: CORNING INCORPORATED, Corning, NY (US)

(72) Inventors: Xiaoju Guo, Painted Post, NY (US); Jeffrey Todd Kohli, Corning, NY (US); John Christopher Mauro, Corning, NY (US); Ronald Leroy Stewart, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 489 days.

This patent is subject to a terminal disclaimer.

(21) Appl. No.: 14/764,786

(22) PCT Filed: Jan. 28, 2014

(86) PCT No.: PCT/US2014/013286
§ 371 (c)(1),
(2) Date: Jul. 30, 2015

(87) PCT Pub. No.: WO2014/120641
PCT Pub. Date: Aug. 7, 2014

(65) Prior Publication Data
US 2015/0368149 A1    Dec. 24, 2015

Related U.S. Application Data

(60) Provisional application No. 61/759,053, filed on Jan. 31, 2013.

(51) Int. Cl.
*C03C 3/085*    (2006.01)
*C03C 3/083*    (2006.01)
(Continued)

(52) U.S. Cl.
CPC .............. *C03C 3/097* (2013.01); *C03C 3/083* (2013.01); *C03C 3/085* (2013.01); *C03C 3/087* (2013.01);
(Continued)

(58) Field of Classification Search
CPC ..... C03C 3/085; C03C 3/097; C03C 2204/00; C03C 4/18; C03C 21/00; C03C 3/064;
(Continued)

(56) References Cited

U.S. PATENT DOCUMENTS

| 485,448 A | * | 11/1892 | Beilmann | ................ G02C 7/16 |
| | | | | 2/13 |
| 3,660,061 A | * | 5/1972 | Donley | ................ C03C 17/002 |
| | | | | 428/432 |

(Continued)

FOREIGN PATENT DOCUMENTS

| EP | 1593658 A1 | 11/2005 |
| JP | 2009233911 | 10/2009 |

(Continued)

OTHER PUBLICATIONS

Understanding CIE *L*a*b Colour Space; file:///H:/Applications/14s/14764786%20-%20Transition%20Metal%20Containing/RCE%208-28-2020/KYDEX%C2%AE_Sheet_Technical_Brief_130-A_-_Understanding_CIE_L_a_b_Colour_Space%20(1).pdf; 2016 (Year: 2016).*

(Continued)

*Primary Examiner* — Humera N. Sheikh
*Assistant Examiner* — Elizabeth D Ivey

(57) ABSTRACT

Glasses that can be chemically strengthened and are colored by transition metals. Most of the glasses are black, with some having high damage resistance and compressive surface layers having high compressive stress and depth of layer after ion exchange. These colored glasses do not require a post-forming heat treatment to produce color and (Continued)

are formable by fusions drawing, rolling, slot drawing, and float glass processes.

28 Claims, 6 Drawing Sheets

(51) Int. Cl.
    *C03C 3/087*     (2006.01)
    *C03C 3/091*     (2006.01)
    *C03C 3/097*     (2006.01)
    *C03C 4/02*     (2006.01)
    *C03C 21/00*     (2006.01)

(52) U.S. Cl.
    CPC ............... *C03C 3/091* (2013.01); *C03C 4/02* (2013.01); *C03C 21/002* (2013.01); *C03C 2204/04* (2013.01); *Y10T 428/315* (2015.01)

(58) Field of Classification Search
    CPC .......... C03C 3/078; C03C 3/118; C03C 4/02; Y10T 428/315; Y10T 428/31; Y10T 428/265
    See application file for complete search history.

(56) References Cited

U.S. PATENT DOCUMENTS

| | | | |
|---|---|---|---|
| 3,772,135 A | | 11/1973 | Hara et al. |
| 4,243,735 A | * | 1/1981 | Kobale ................ H01J 9/2278 430/25 |
| 5,017,830 A | * | 5/1991 | Koike ..................... H01J 9/146 313/402 |
| 5,070,044 A | * | 12/1991 | Pinckney ................. C03C 4/02 501/3 |
| 5,190,896 A | * | 3/1993 | Pucilowski .............. C03C 4/02 501/64 |
| 6,105,394 A | * | 8/2000 | Sridharan ................ C03C 8/02 501/14 |
| 7,641,730 B2 | | 1/2010 | Fujiwara et al. |
| 8,048,816 B2 | | 11/2011 | Beall et al. |
| 8,075,999 B2 | | 12/2011 | Barefoot et al. |
| 8,232,218 B2 | | 7/2012 | Dejneka et al. |
| 2005/0250639 A1 | | 11/2005 | Siebers et al. |
| 2008/0286548 A1 | | 11/2008 | Ellison et al. |
| 2009/0142568 A1 | | 6/2009 | Dejneka et al. |
| 2009/0220761 A1 | | 9/2009 | Dejneka et al. |
| 2010/0009154 A1 | | 1/2010 | Allan et al. |
| 2010/0291353 A1 | | 11/2010 | Dejneka et al. |
| 2011/0045961 A1 | * | 2/2011 | Dejneka ................ C03B 17/064 501/66 |
| 2011/0071012 A1 | | 3/2011 | Kondo et al. |
| 2011/0092354 A1 | | 4/2011 | Duran et al. |
| 2011/0201490 A1 | * | 8/2011 | Barefoot ............. C03B 33/0222 501/66 |
| 2011/0294648 A1 | * | 12/2011 | Chapman ................ C03C 3/097 501/63 |
| 2013/0004758 A1 | * | 1/2013 | Dejneka ................. C03C 3/087 428/220 |
| 2013/0128434 A1 | * | 5/2013 | Yamamoto .............. C03C 3/083 361/679.01 |
| 2014/0013554 A1 | * | 1/2014 | Hojaji ....................... B09B 5/00 27/1 |
| 2014/0182335 A1 | * | 7/2014 | Lee ....................... C03C 21/008 65/30.14 |

FOREIGN PATENT DOCUMENTS

| | | | | |
|---|---|---|---|---|
| JP | 2013-502371 A | | 1/2013 | |
| WO | 2012074949 A1 | | 6/2012 | |
| WO | 2012124757 A1 | | 9/2012 | |
| WO | WO-2012124758 A1 | * | 9/2012 | ........... H05K 5/0086 |
| WO | 2013181134 | | 12/2013 | |
| WO | WO2013181134 | * | 12/2013 | |
| WO | WO-2013181134 A1 | * | 12/2013 | ......... E05B 29/0026 |

OTHER PUBLICATIONS

The Chemistry of Coloured Glass; Compound Interest ; https://www.compoundchem.com/wp-content/uploads/2015/03/The-Chemistry-of-Coloured-Glass.pdf; 2015 (Year: 2015).*
"What is the Visible Light Spectrum"; Jones, Andrew Zimmerman; https://www.thoughtco.com/the-visible-light-spectrum-2699036; Feb. 14, 2020 (Year: 2020).*
Boyd et al; "Glass" Kirk-Othmer Encyclopedia of Chemical Technology; vol. 12, 4th Edition 74 pages.
Guo et al; "Unified approach for determining the enthalpic fictive temperature of glasses with arbitrary thermal history"; Journal of Non-Crystalline Solids, 357, (2011) 3230-3236.
Gupta et al; "Boron Coordination in Rapidly Cooled and in Annealed Aluminum Borosilicate Glass Fibers"; J. Am. Ceram. Soc., 68 (3), C-82 (1985).
Makishima et al. "Glass materials design system: VitrES" Japan, Fujitsu Limited, 1993 44(6) pp. 560-565.
Morimoto, "Phase separation of crystallization in the system $SiO_2$—$Al_2O_3$—$P_2O_5$—$B_2O_3$—$Na_2O$ glasses," Journal of Non-Crystalline Solids, 352(8) 2006, pp. 756-760.
English Translation of JP2015556079 Office Action dated Feb. 6, 2019, Japan Patent Office, 4 Pgs.
Toplis et al. "A 31P MAS NMR study of glasses in the system $xNa_2O$—$(1-x)Al_2O_3$—$2SiO_2$—$yP_2O_5$," Journal of Non-Crystalline Solids 224(1) 1998, pp. 57-68.
Japanese Patent Application No. 2015556079; English Translation of the Office Action dated Sep. 4, 2019; Japan Patent Office; 3 Pgs.

* cited by examiner

TRANSITION METAL-CONTAINING, ION EXCHANGEABLE COLORED GLASSES

CROSS-REFERENCE TO RELATED APPLICATIONS

This application claims the benefit of priority under 35 U.S.C. § 365 of International Patent Application Serial No. PCT/US14/13286 filed on Jan. 28, 2014, which claims the benefit of priority under 35 U.S.C. § 119 of U.S. Provisional Application Ser. No. 61/759,053 filed on Jan. 31, 2013 the content of which is relied upon and incorporated herein by reference in its entirety.

BACKGROUND

The disclosure relates to glasses that are capable of chemical strengthening by ion exchange and have intrinsic damage resistance. More particularly, the disclosure relates to such glasses that comprise transition metal oxides that act as colorants.

Ion exchangeable glass compositions offer advantages in glass manufacturability and/or final properties compared to previous glass compositions. Such glasses are used in applications such as, but not limited to, cover glasses, windows, enclosures, and the like in a variety of electronic devices, including displays in entertainment and communication devices.

SUMMARY

Glasses that can be chemically strengthened and are colored by transition metals are provided. Most of the glasses described herein are black, with some having high damage resistance and compressive surface layers having high compressive stress and depth of layer after ion exchange. These colored glasses do not require a post-forming heat treatment to produce color. Based on liquidus data, these glasses are fusion formable. However, other processes, such as rolling, slot drawing, and float glass processes may be used to produce these glasses.

Accordingly, one aspect of the disclosure is to provide a silicate glass having a Vickers crack initiation threshold of at least 15 kgf. The silicate glass comprises: at least about 50 mol % $SiO_2$; at least about 10 mol % $R_2O$, wherein $R_2O$ comprises $Na_2O$; $Al_2O_3$, wherein −0.5 mol % ≤ $Al_2O_3$ (mol %)−$R_2O$ (mol %) ≤ 2 mol %; $B_2O_3$, wherein $B_2O_3$ (mol %)−($R_2O$ (mol %)−$Al_2O_3$ (mol %)) ≤ 4.5 mol %; and at least one transition metal colorant, the transition metal oxide colorant comprising at least one of $V_2O_5$, NiO, CuO, $Cr_2O_3$, $MnO_2$, $Fe_2O_3$, $Co_3O_4$, $Nb_2O_5$, and $TiO_2$.

A second aspect of the disclosure is to provide a silicate glass having a zircon breakdown temperature that is equal to the temperature at which the silicate glass has a viscosity in a range from about 30 kPoise to about 40 kPoise, and a Vickers crack initiation threshold of at least 15 kgf. The silicate glass comprises: at least about 50 mol % $SiO_2$; at least about 10 mol % $R_2O$, wherein $R_2O$ comprises $Na_2O$; $Al_2O_3$, wherein $Al_2O_3$ (mol %)<$R_2O$ (mol %); $B_2O_3$, wherein $B_2O_3$ (mol %)−($R_2O$ (mol %)−$Al_2O_3$ (mol %)) ≥ 2 mol %; and at least one transition metal colorant, the transition metal oxide colorant comprising at least one of $V_2O_5$, NiO, CuO, $Cr_2O_3$, $MnO_2$, $Fe_2O_3$, $Co_3O_4$, $Nb_2O_5$, and $TiO_2$.

A third aspect of the disclosure is to provide a silicate glass comprising at least about 4% $P_2O_5$ and at least one transition metal colorant, wherein: [$M_2O_3$ (mol %)/$R_xO$ (mol %)]<1.4; or 1.3<[$P_2O_5$ (mol %)+$R_2O$ (mol %))/$M_2O_3$ (mol %)]≤2.3, where $M_2O_3$ (mol %)=$Al_2O_3$ (mol %)+$B_2O_3$ (mol %), $R_xO$ is the sum of monovalent and divalent cation oxides present in the silicate glass, and $R_2O$ is the sum of divalent cation oxides present in the silicate glass. The transition metal oxide colorant comprises at least one of $V_2O_5$, NiO, CuO, $Cr_2O_3$, $MnO_2$, $Fe_2O_3$, $Co_3O_4$, $Nb_2O_5$, and $TiO_2$.

These and other aspects, advantages, and salient features will become apparent from the following detailed description, the accompanying drawings, and the appended claims.

DETAILED DESCRIPTION

Figure 1:
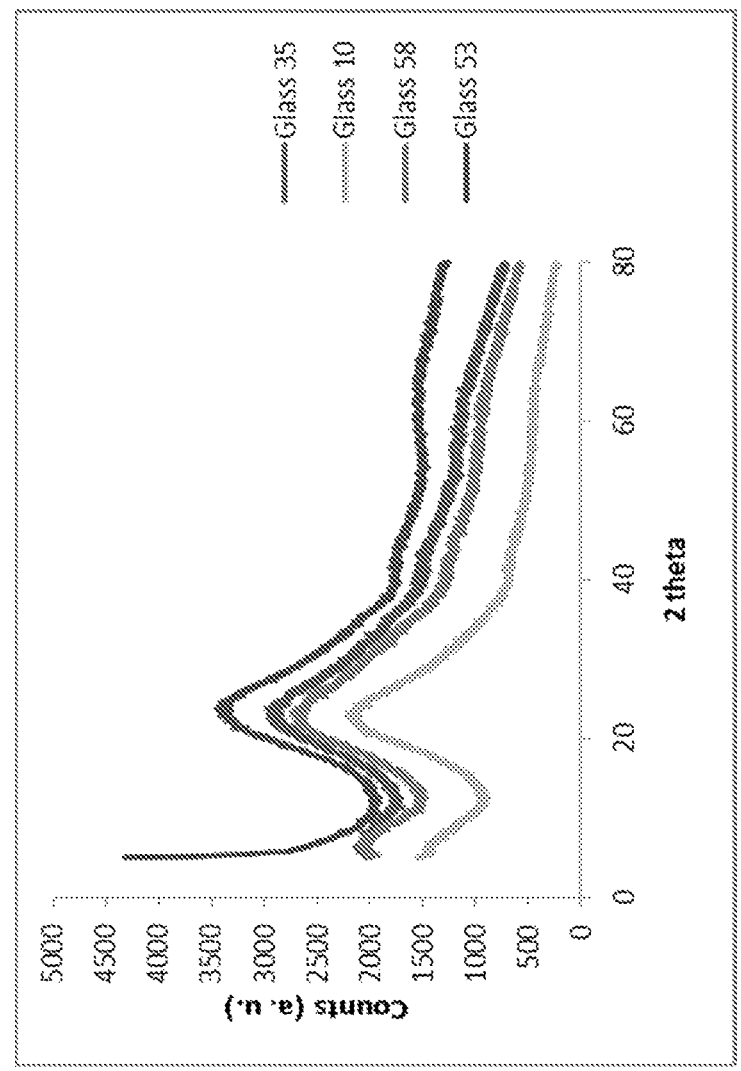
FIG. 1 is a plot of x-ray diffraction spectra for sample glasses.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

New ion exchangeable glass compositions are continually being developed to offer advantages in glass manufacturability and/or final properties compared to previous glass compositions. Such glasses are used in applications such as, but not limited to, cover glasses, windows, enclosures, and the like in a variety of electronic devices, including displays in entertainment and communication devices.

Presently, such glasses are typically based on two similar glass systems: $SiO_2$—$Al_2O_3$—$B_2O_3$—$MgO$—$Na_2O$—$P_2O_5$ and $SiO_2$—$Al_2O_3$—$MgO$—$Na_2O$. Due to the presence of boron or phosphorus in the glass, the first group of glasses generally exhibits a high indentation threshold, as measured by Vickers crack indentation experiments, after ion exchange. The presence of boron and phosphorus generates an open structure (i.e., high molar volume) in the glass, which also enhances diffusion for deep ion exchange in these glasses.

Many transition metal oxides may be used to provide glass with color. Such glasses may also be converted to glass-ceramics by post-forming heat treatment. Described herein are glasses that can be chemically strengthened and are colored by transition metals. Most of the glasses described herein are black, with some having high damage resistance and compressive surface layers having high compressive stress and depth of layer after ion exchange. These colored glasses do not require a post-forming heat treatment to produce color. Based on liquidus data, these glasses are fusion formable. However, other processes, such as rolling, slot drawing, and float glass processes may be used to produce these glasses.

In some aspects, the silicate glasses described herein comprise at least about 50 mol % $SiO_2$; at least about 10 mol % $R_2O$, where $R_2O$ comprises $Na_2O$; $Al_2O_3$, wherein –0.5 mol % $Al_2O_3$ (mol %)–$R_2O$ (mol %) 2 mol %; and $B_2O_3$, wherein $B_2O_3$ (mol %)–($R_2O$ (mol %)–$Al_2O_3$ (mol %)) 4.5 mol %. In some embodiments, these glasses comprise at least about 50 mol % $SiO_2$, from about 9 mol % to about 22 mol % $Al_2O_3$, from about 3 mol % to about 10 mol % $B_2O_3$, from about 9 mol % to about 20 mol % $Na_2O$, from 0 mol % to about 5 mol % $K_2O$, 0 mol %≤$MgO$≤6 mol %, and 0 mol %≤$ZnO$≤6 mol %. In addition, the glasses may optionally comprise at least one of CaO, BaO, and SrO, wherein 0 mol %≤CaO+SrO+BaO≤2 mol %.

In other aspects, the silicate glass comprises at least about 50 mol % $SiO_2$, at least about 10 mol % $R_2O$, wherein $R_2O$ comprises $Na_2O$; $Al_2O_3$, wherein $Al_2O_3$ (mol %)<$R_2O$ (mol %); and $B_2O_3$, wherein $B_2O_3$ (mol %)–($R_2O$ (mol %)–$Al_2O_3$ (mol %)) 2 mol %. In some embodiments, these glasses comprise at least about 50 mol % $SiO_2$, from about 9 mol % to about 22 mol % $Al_2O_3$, from about 3 mol % to about 10 mol % $B_2O_3$, from about 9 mol % to about 20 mol % $Na_2O$, from 0 mol % to about 5 mol % $K_2O$, from 0 mol % to about 6 mol % $MgO$; and from 0 mol % to about 6 mol % $ZnO$. In addition, the glasses may optionally comprise at least one of CaO, BaO, and SrO, wherein 0 mol %≤CaO+SrO+BaO≤2 mol %.

In still other aspects, the silicate glass comprises at least about 4% $P_2O_5$ and at least one transition metal colorant, the transition metal oxide colorant comprising at least one of $V_2O_5$, NiO, CuO, $Cr_2O_3$, $MnO_2$, $Fe_2O_3$, $Co_3O_4$, $Nb_2O_5$, and $TiO_2$ wherein: [$M_2O_3$ (mol %)/$R_xO$ (mol %)]<1.4; or 1.3<[$P_2O_5$ (mol %)+$R_2O$ (mol %))/$M_2O_3$ (mol %)]≤2.3, where $M_2O_3$ (mol %)=$Al_2O_3$ (mol %)+$B_2O_3$ (mol %), $R_xO$ is the sum of monovalent and divalent cation oxides present in the silicate glass, and $R_2O$ is the sum of divalent cation oxides present in the silicate glass. In some embodiments, [$M_2O_3$ (mol %)/$R_xO$ (mol %)]<1.4 and, in some embodiments, [$M_2O_3$ (mol %)/$R_xO$ (mol %)]<1. In other embodiments, 1.3<[($P_2O_5$ (mol %) $R_2O$ (mol %))/$M_2O_3$ (mol %)][($P_2O_5$ (mol %) $R_2O$ (mol %))/$M_2O_3$ (mol %)]≤2.3 am, in some embodiments, 1.5<[($P_2O_5$ (mol %)+$R_2O$ (mol %))/$M_2O_3$ (mol %)]≤2.0. In some embodiments, the glass comprises from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$ and, in some embodiments, from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$.

In the silicate glass compositions described herein, $SiO_2$ serves as the primary glass-forming oxide. The concentration of $SiO_2$ in the glass should be sufficiently high in order to provide the glass with sufficiently high chemical durability that is suitable for some applications such as, for example touch screen applications. However, the melting temperature (200 poise temperature) of pure $SiO_2$ or glasses having high $SiO_2$ contents is considered too high, since defects such as fining bubbles may appear during manufacture. Furthermore, $SiO_2$, compared to most oxides, decreases the level of compressive stress created by ion exchange. Accordingly, the silicate glasses described herein comprise at least 50 mol % $SiO_2$. In some embodiments, these glasses comprise from about 66 mol % to about 74 mol % $SiO_2$ and, in other embodiments from about 60 mol % to about 66 mol % $SiO_2$. In another aspect, the silicate glasses comprise from about 40 mol % to about 70 mol % $SiO_2$ and, in some embodiments, from about 50 mol % to about 65 mol % $SiO_2$.

Alumina ($Al_2O_3$) can also serve as a glass former in these silicate glasses. Like $SiO_2$, alumina generally increases the viscosity of the melt. In addition, an increase in $Al_2O_3$ relative to the alkalis or alkaline earths generally results in improved durability of the glass. In some embodiments, –0.5 mol % $Al_2O_3$ (mol %)–$R_2O$ (mol %) 2 mol %. In other embodiments, $Al_2O_3$ (mol %)<$R_2O$ (mol %). The structural role of the aluminum ions depends on the glass composition. When the concentration of alkali oxide(s) [$R_2O$] is greater than or equal to the concentration of alumina [$Al_2O_3$], all aluminum is found in tetrahedral coordination with the alkali ions acting as charge-balancers. This is the case for some of the glasses described herein. In other glasses, the concentration of alkali oxide is less than the concentration of aluminum ions, in which case divalent cation oxides (RO) can also charge balance tetrahedral aluminum to various extents. While elements such as calcium, zinc, strontium, and barium behave equivalently to two alkali ions, the high field strength of magnesium ions cause them to not fully charge balance aluminum in tetrahedral coordination, resulting in formation of five- and six-fold coordinated aluminum. Generally, $Al_2O_3$ plays an extremely important role in ion-exchangeable glasses, since it enables a strong network backbone (i.e., high strain point) while allowing for relatively fast diffusivity of alkali ions. High $Al_2O_3$ concentrations, however, generally lower the liquidus viscosity. $Al_2O_3$ concentration therefore needs to be kept in a reasonable range. In some embodiments, the silicate glasses described herein comprise from about 9 mol % to about 22 mol %

Al$_2$O$_3$ and, in other embodiments, the glasses comprise from about 12 mol % to about 22 mol % Al$_2$O$_3$. In another aspect, the glass comprises from about 11 mol % to about 25 mol % Al$_2$O$_3$ and, in some embodiments, from about 14 mol % to about 20 mol % Al$_2$O$_3$.

The silicate glasses described herein comprise at least about 10 mol % alkali metal oxides R$_2$O, wherein R$_2$O includes Na$_2$O. Alkali metal oxides (Li$_2$O, Na$_2$O, K$_2$O, Rb$_2$O, and Cs$_2$O) serve as aids in achieving low melting temperature and low liquidus temperatures of the glass. However, the addition of alkali oxide(s) dramatically increases the coefficient of thermal expansion (CTE) and lowers the chemical durability of the glass. The silicate glasses described herein, in some embodiments, comprise from about 9 mol % to about 20 mol % Na$_2$O and, in other embodiments, from about 10 mol % to about 20 mol % Na$_2$O. in another aspect, the glass comprises from about 13 mol % to about 25 mol % Na$_2$O and, in some embodiments, from about 14 mol % to about 20 mol % Na$_2$O.

The glasses may also comprise from 0 mol % to about 5 mol % K$_2$O. To perform ion exchange, the presence of a small alkali oxide such as Li$_2$O and Na$_2$O is required to exchange with larger alkali ions (e.g., K$^+$) from a salt bath or other ion exchange medium. Three types of ion exchange can generally be carried out: Nat-for-Li$^+$ exchange, which results in a deep depth of layer but low compressive stress; K$^+$-for-Li$^+$ exchange, which results in a small depth of layer but a relatively large compressive stress; and K$^+$-for-Na$^+$ exchange, which results in intermediate depth of layer and compressive stress. A sufficiently high concentration of the small alkali oxide is necessary to produce a large compressive stress in the glass, since compressive stress is proportional to the number of alkali ions that are exchanged out of the glass. In some of the example glasses, a small amount of K$_2$O is introduced into the glass to improve diffusivity and lowers the liquidus temperature, but it generally increases the CTE and decreases CS. Thus, the potassium concentration of the glass is kept at a very low level (e.g., 5 mol % and, in some embodiments, <1 mol %) and, in certain embodiments, the glass is free of potassium. In certain embodiments, the silicate glass is free of lithium.

Divalent cation oxides (such as alkaline earth oxides and ZnO) also improve the melting behavior of the glass. With respect to ion exchange performance, however, the presence of divalent cations acts to decrease alkali mobility. The negative effect of divalent cations on ion exchange performance is especially pronounced with the larger divalent cations. Furthermore, the smaller divalent cation oxides (e.g., MgO, ZnO) generally help increase the compressive stress of the glass more than the larger divalent cations. Hence, MgO and ZnO offer several advantages with respect to improved stress relaxation while minimizing the adverse effects on alkali diffusivity. However, when the concentrations of MgO and ZnO in the glass are high, these oxides are prone to form forsterite (Mg$_2$SiO$_4$) and gahnite (ZnAl$_2$O$_4$) or willemite (Zn$_2$SiO$_4$), respectively, thus causing the liquidus temperature of the glass to rise very steeply when the MgO and ZnO contents are above certain levels. In some embodiments, the silicate glass comprises at least about 0.1 mol % of at least one of MgO and ZnO, and in some embodiments, 0 mol %≤MgO≤6 mol % and 0 mol %≤ZnO≤6 mol %. In some embodiments, either MgO or ZnO as the only divalent cation oxide in the glass; i.e., the glass is free of other alkaline earth oxides (CaO, BaO, SrO). In other embodiments, however, the glass may include at least one of CaO, BaO, and SrO, wherein 0 mol %≤CaO+SrO+BaO≤2 mol %.

The glasses described herein comprise B$_2$O$_3$ and, in some embodiments, the glass comprises from about 3 mol % to about 10 mol % B$_2$O$_3$. In another aspect, the glasses comprises less than about 1 mol % B$_2$O$_3$ and, in some embodiments, 0 mol % B$_2$O$_3$. The addition of B$_2$O$_3$ and P$_2$O$_5$ improve the damage resistance of the glass. When boron is not charge balanced by alkali oxides or divalent cation oxides, it will be in trigonal coordination state, and thus open up the structure and provide greater damage resistance. The network around these trigonal coordinated borons is not as rigid as tetrahedrally coordinated ones, the bonds are floppy, and therefore the glasses can tolerate some deformation before crack formation. In some embodiments, the silicate glass comprises greater than 4.5 mol % B$_2$O$_3$ in which boron cations are three-fold coordinated. In other embodiments, the glass comprises greater than 2 mol % B$_2$O$_3$ in which boron cations are three-fold coordinated and, in some embodiments the silicate glass comprises from about 2 mol % to about 4.5 mol % of three-fold coordinated boron cations. In certain embodiments, B$_2$O$_3$ (mol %)−(R$_2$O (mol %)−Al$_2$O$_3$ (mol %)) 2 mol %, and some embodiments, B$_2$O$_3$ (mol %)−(R$_2$O (mol %)−Al$_2$O$_3$ (mol %)) 4.5 mol %. In some embodiments, B$_2$O$_3$ (mol %)−(R$_2$O (mol %)−Al$_2$O$_3$ (mol %)) 4.5 mol %. Furthermore, both boron and phosphorus decrease the melting viscosity and effectively help to suppress zircon breakdown viscosity.

Unlike B$_2$O$_3$, P$_2$O$_5$ can improve the diffusivity of alkali cations and decrease ion exchange times. In one aspect, P$_2$O$_5$ may replace at least a portion of B$_2$O$_3$ in the glass such that 4.5 mol % B$_2$O$_3$ (mol %)+P$_2$O$_5$ (mol %) 10 mol %. In another aspect, the glasses described herein may comprise at least 4 mol % P$_2$O$_5$, in some embodiments, from about 4 mol % to about 15 mol % P$_2$O$_5$ and, in still other embodiments, from about 4 mol % to about 10 mol % P$_2$O$_5$. However, the floppy structure formed by boron and phosphorus sacrifice some compressive stress capability where the effect from P$_2$O$_5$ is also pronounced. The coordination number change of B$_2$O$_3$ on fictive temperature is the source of the variation of indentation threshold with thermal history. The compositions included herein are boron containing glasses. Trigonally coordinated boron in glasses with higher fictive temperatures will partially convert to tetrahedral coordinated when the fictive temperature of the glass decreases. During annealing or heat treatment, the fictive temperature of the glass will be reduced, and the amount of trigonal coordinated boron will therefore decrease. If this change is dramatic, the level of trigonally coordinated boron will not be sufficient to sustain the open glass structure.

In some aspects, the glasses described herein are ion exchanged by those means known in the art such as, for example immersion in a molten salt bath containing salts of the cation that is to replace the cation in the glass. Cations—typically monovalent alkali metal cations that which are present in these glasses are replaced with larger cations—typically monovalent alkali metal cations, although other cations such as Ag$^+$ or Tl$^+$ may be used—having the same valence or oxidation state. The replacement of smaller cations with larger cations creates a surface layer that is under compression, or compressive stress CS. This layer extends from the surface of the glass into the interior or bulk of the glass to a depth of layer DOL. The compressive stress in the surface layers of the glass are balanced by a tensile stress, or central tension CT, in the interior or inner region of the glass. The ion exchanged glasses, in some embodiments, have a surface layer under a compressive stress of at least about 800 MPa and, in certain embodiments, at least 900 MPa, wherein the layer extends to a depth of layer of at least about 45 µm and, in some embodiments, at least about 30 µm. Compressive stress and depth of layer are measured using those means known in the art. Such means include, but are not limited to measurement of surface stress (FSM) using commercially available instruments such as the FSM-6000, manufactured by Luceo Co., Ltd. (Tokyo, Japan), or the like. Methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the stress-induced birefringence of the glass. SOC in turn is measured by those methods that are known in the art, such as fiber and four point bend method, both of which are described in ASTM standard C770-98 (2008), entitled "Standard Test Method for Measurement of Glass Stress-Optical Coefficient," the contents of which are incorporated herein by reference in their entirety, and a bulk cylinder method.

The ion exchanged glasses described herein possess a degree of intrinsic damage resistance (IDR), which may be characterized by the Vickers crack initiation threshold of the ion exchanged glass. In some embodiments, the ion exchanged glass has a Vickers crack initiation threshold of at least about 15 kgf. In some embodiments, the ion exchanged glass has a Vickers crack initiation threshold in a range from about 20 kgf to about 30 kgf and, in other embodiments, at least about 25 kgf. The Vickers crack initiation threshold measurements described herein are performed by applying and then removing an indentation load to the glass surface at a rate of 0.2 mm/min. The maximum indentation load is held for 10 seconds. The crack initiation threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

In some embodiments, the silicate glasses described herein are black or brown in color. The glasses may be opaque or nearly opaque. In some embodiments, the silicate glass has a transmission of less than 1% at wavelengths in the visible region of the spectrum (about 400 nm to about 770 nm) and, in some embodiments, 0% transmission in the as measured for samples having a thickness of about 1 mm. In some embodiments, the silicate glass has color coordinates a*, b*, and L*, wherein a* is in a range from about 0 to about −6, b* is in a range from about 3 to about −5, and L* is in a range from about 30 to 23.

EXAMPLES

The following examples are provided to illustrate the features and advantages of the glasses described herein and are in no way intended to limit the disclosure and appended claims thereto.

Fifty-four glasses based on four different compositions were prepared. Most of the glasses prepared were black or opaque. The compositions and selected properties of these samples are listed in Tables 1-4. Samples 1-30 (Tables 1a-e) in the following tables have a $Na_2O$—$Al_2O_3$—$SiO_2$ base composition plus one or more transition metal colorants. Samples 31-39 in Tables 2a-b have a base composition "A" (67.35 mol % $SiO_2$, 12.66 mol % $Al_2O_3$, 2.36 mol % MgO, 13.73 mol % $Na_2O$, and 3.73 mol % $B_2O_3$) plus different combinations of transition metal colorants. Samples 40-57 in Tables 3a-b have a base composition "B" (64.76 mol % $SiO_2$, 13.94 mol % $Al_2O_3$, 2.36 mol % MgO, 13.82 mol % $Na_2O$, and 5 mol % $B_2O_3$) plus different combinations of transition metal colorants. Samples 58-60 in Table 4 have a base composition "C" (64.76 mol % $SiO_2$, 13.94 mol % $Al_2O_3$, 2.36 mol % MgO, 13.82 mol % $Na_2O$, and 5 mol % $B_2O_3$) plus different combinations of transition metal colorants.

The compositions of these samples were analyzed by x-ray fluorescence and/or inductively coupled plasma optical emission spectrometry (ICP-OES) plus FES. Anneal and strain points were determined by beam bending viscometry. Softening points were determined by parallel plate viscometry. Glass color was observed on 0.8 or 1 mm thick pieces of crucible melted glasses. The Coefficient of thermal expansion (CTE) reported in the Tables is the average value between room temperature and 300° C. Liquidus temperature was determined in a gradient boat test with 72 hours duration. The liquidus temperature listed for samples 10-21 is the result for the internal reading, the note "Unk" in the tables means that the primary phase is unknown. Elastic moduli were determined by resonant ultrasound spectroscopy. Refractive index is stated for 589.3 nm of the non-colored glasses. Stress optical coefficient (SOC) was determined by the diametral compression method.

Table 5 contains a summary of ion exchange properties of some of the transparent glasses listed in Table 1a. The compressive stress (CS) and depth of layer (DOL) of the samples were obtained as a result of ion exchange treatment of fictivated samples (temperatures are determined to be 60° C. above annealing point) in a molten salt bath of refined grade $KNO_3$ carried out at 410° C. for 2, 4, and 6 hours. CS and DOL are stated in the units of MPa and µm, respectively. CS and DOL of the visibly opaque black glasses were not measured since they are not transparent at the wave length used for the FSM. Only one colored glass (sample no. 3) in Table 2 was transparent enough to use the FSM.

FIG. 1 contains x-ray diffraction spectra for four sample glasses. The FIG. 1 includes a spectrum of one sample from each base glass. The x-ray diffraction spectra show that all of the samples are non-crystalline.

Figure 2:
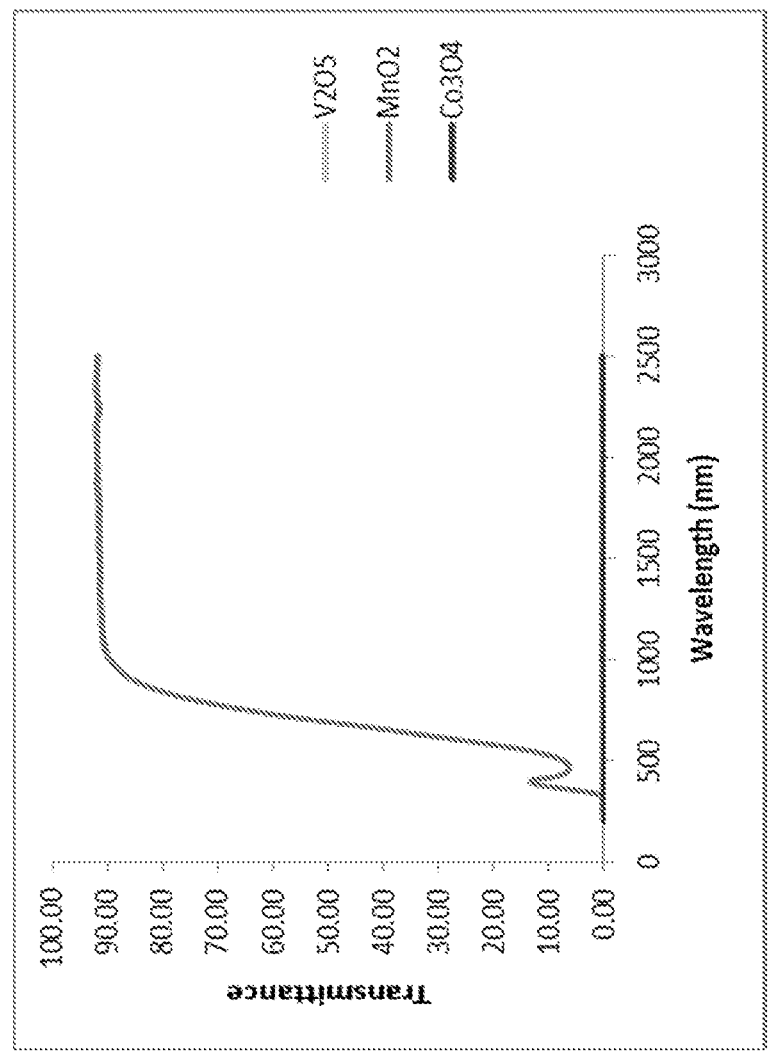
FIG. 2 is a ultraviolet-visible-near infrared (UV-Vis-NIR) transmission spectra of sample glasses.
Figure 3:
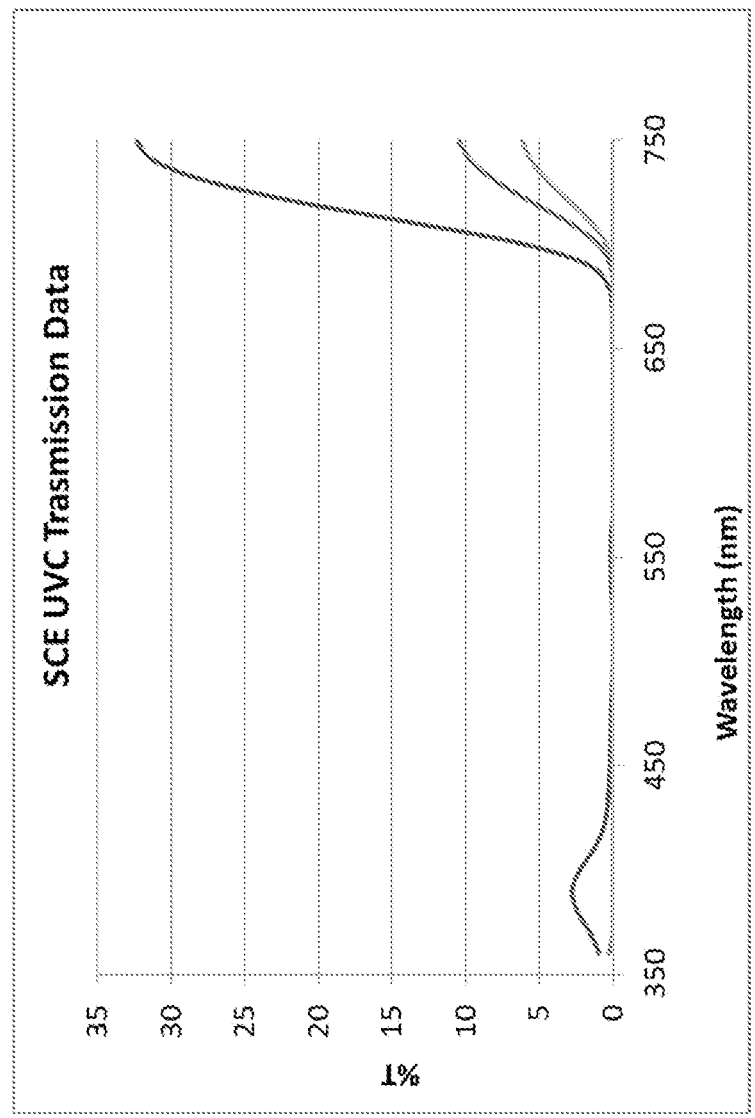
FIG. 3 is a SCE UVC transmission spectra of black glasses based on base glass B.
Figure 4:
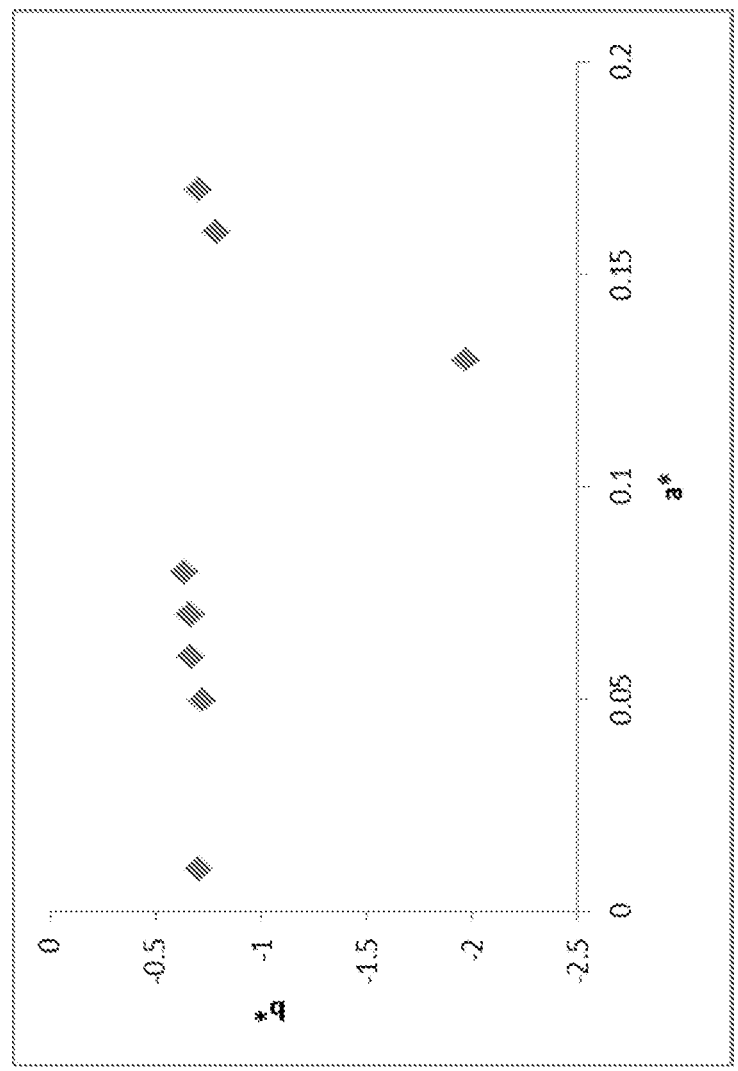
FIG. 4 is a plot of reflectance color a* and b* results for black glasses based on base glass B.
Figure 5:
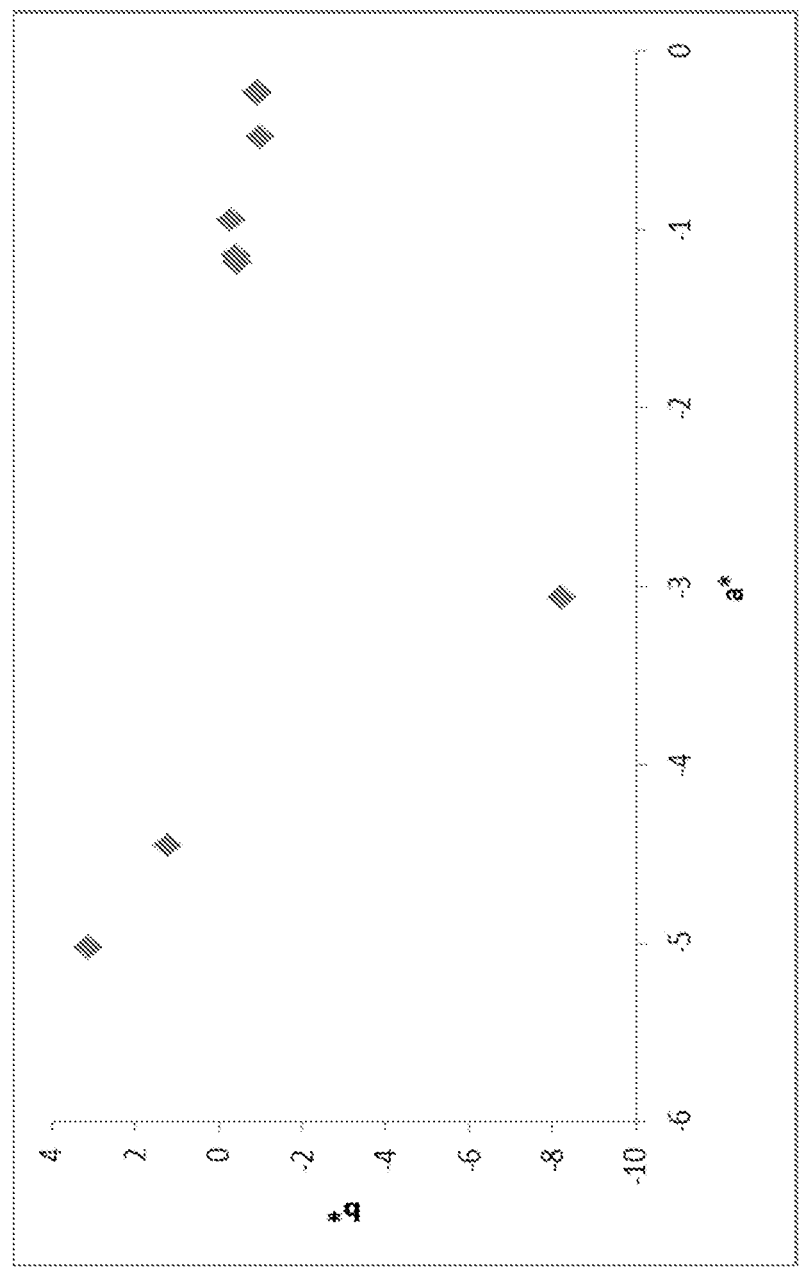
FIG. 5 is a plot of reflectance color a* and b* results for black glasses based on base glass B.

FIG. 2 is a plot of ultraviolet-visible-near infrared (UV-Vis-NIR) transmission spectra of example glasses (glass samples 2, 3, and 5) based on base glass A. Measurements were performed on 1 mm thick glasses. SCE UVC transmission spectra of 0.8 mm thick samples of black glasses based on base glass B are shown in FIG. 3. FIGS. 4 and 5 are plots of reflectance color a* and b* results obtained for black glasses that are based on base glass B and C, respectively.

Figure 6:
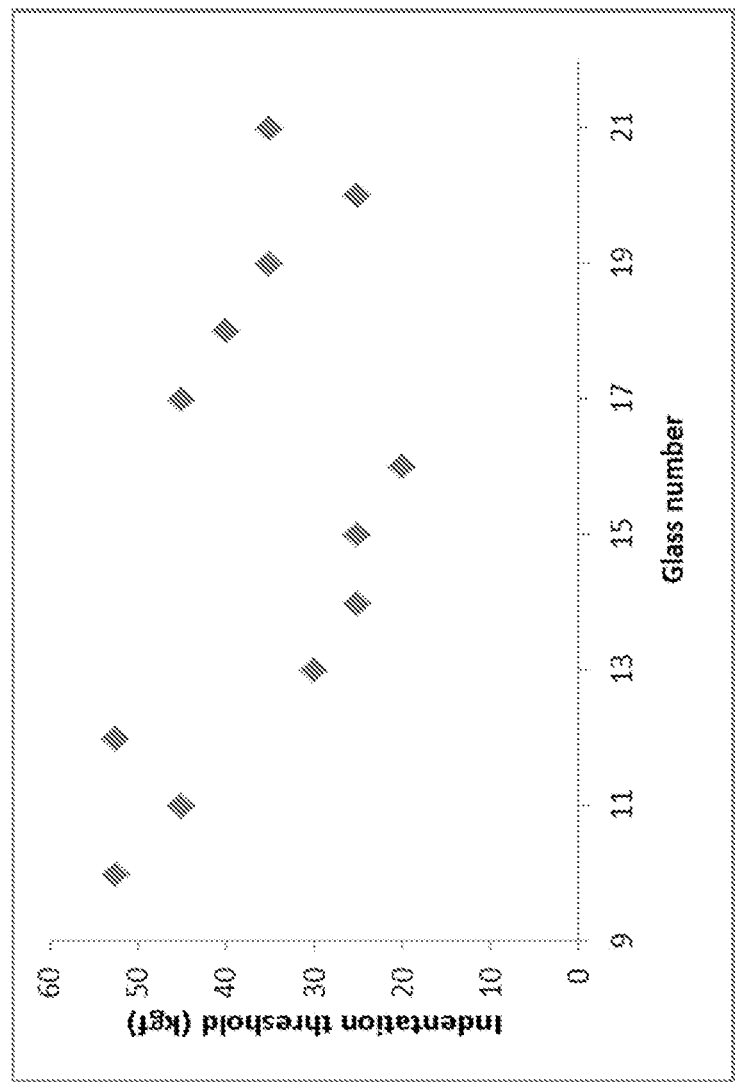
FIG. 6 is a plot of Vickers indentation threshold for sample glasses that had been ion exchanged at 410° C. for 2 hours.

Vickers indentation thresholds are plotted for samples 10-21, which are based on base glass A, in FIG. 6. Indentation threshold measurements were performed on glasses that were fictivated (i.e., heating of the glass to a first temperature at which the glass has a viscosity of less than $10^{13}$ poise followed by equilibrating the glass at the first temperature for a predetermined time period, and then quickly quenching the glass to a second temperature below the strain point of the glass) and then ion exchanged in a $KNO_3$ salt bath at 410° C. for 2 hours.

TABLE 1a

Compositions of samples 1-9, which are based on base glass A.

| Composition (mol %) | 1 MgO added | 2 $V_2O_5$ added | 3 $MnO_2$ added | 4 $Fe_2O_3$ added | 5 $Co_3O_4$ added |
|---|---|---|---|---|---|
| $SiO_2$ | 65.39 | 65.63 | 65.48 | 65.55 | 65.6 |
| $Al_2O_3$ | 14.46 | 14.46 | 14.48 | 14.43 | 14.51 |
| MgO | 5.12 | 0 | 0 | 0 | 0 |
| $Na_2O$ | 14.95 | 14.82 | 15.49 | 15.1 | 15.28 |
| $Nb_2O_5$ | | | | | |
| $Fe_2O_3$ | | | | 4.86 | |
| $V_2O_5$ | | 5.05 | | | |
| $MnO_2$ | | | 4.4 | | |
| $Co_3O_4$ | | | | | 4.55 |
| $TiO_2$ | | | | | |
| $B_2O_3$ | | | | | |
| $P_2O_5$ | | | | | |

| Composition (mol %) | 6 $Nb_2O_5$ added | 7 $TiO_2$ added | 8 $B_2O_3$ added | 9 $P_2O_5$ added |
|---|---|---|---|---|
| SiO2 | 65.68 | 65.6 | 65.72 | 65.82 |
| $Al_2O_3$ | 14.38 | 14.44 | 14.46 | 14.33 |
| MgO | 0 | 0 | 0 | 0 |
| $Na_2O$ | 14.83 | 14.96 | 14.73 | 14.86 |
| $Nb_2O_5$ | 5.04 | 0 | 0 | |
| $Fe_2O_3$ | | | | |
| $V_2O_5$ | | | | |
| $MnO_2$ | | | | |
| $Co_3O_4$ | | | | |
| $TiO_2$ | | 4.92 | | |
| $B_2O_3$ | | | 5.0 | |
| $P_2O_5$ | | | | 4.9 |

TABLE 1b

Properties of samples 10-9, which are based on base glass A.

| Properties | 1 | 2 | 3 | 4 | 5 |
|---|---|---|---|---|---|
| Anneal Pt. (° C.) | 701.4 | 660.3 | 663.8 | | 609 |
| Strain Pt. (° C.) | 649.7 | 614.9 | 613.4 | | 876.1 |
| Softening Pt. (° C.) | 956 | 989.3 | 918.6 | | 555.8 |
| Glass color | T[1] | Black | Brown | Black | Black |
| Density (g/cm³): | 2.446 | 2.444 | 2.494 | 2.574 | 2.662 |
| CTE (×10⁻⁷/° C.) | 78.8 | | 81.8 | 80.6 | |
| Liquidus Temp (° C.) | | 970 | 1040 | | 1245 |
| Primary Devit Phase | | Albite | unk | | unk |
| Liquidus Visc. (Poise) | | 2.46 * 10⁶ | | | 2567 |
| Poisson's Ratio | 0.212 | 0.202 | 0.222 | | 0.225 |
| Shear Modulus (Mpsi) | 4.402 | 4.495 | 4.324 | | 3.803 |
| Young's Modulus (Mpsi) | 10.671 | 10.801 | 10.569 | | 9.316 |
| Hardness (Non-IX)[1] | | 623 | 609 | | 527 |
| Hardness (IX'd)[2] | | 743 | 710 | | 618 |
| Refractive Index | 1.5044 | | | | |

TABLE 1b-continued

| [1]Transparent Properties | 6 | 7 | 8 | 9 |
|---|---|---|---|---|
| Anneal Pt. (° C.) | 765.8 | 743 | 635.5 | 701 |
| Strain Pt. (° C.) | 713.9 | 689.4 | 581.6 | 641.2 |
| Softening Pt. (° C.) | 1019.4 | 1017.9 | 917.1 | 992.1 |
| Glass color | L-pink | L-Brown | T | T |
| Density (g/cm³): | 2.636 | 2.45 | 2.389 | 2.382 |
| CTE (×10⁻⁷/° C.) | 73.9 | | 80.2 | 78.8 |
| Liquidus Temp (° C.) | | | | |
| Primary Devit Phase | | | | |
| Liquidus Visc. (Poise) | | | | |
| Poisson's Ratio | 0.205 | 0.228 | 0.195 | 0.231 |
| Shear Modulus (Mpsi) | 4.516 | 4.183 | 3.964 | 3.864 |
| Young's Modulus (Mpsi) | 10.881 | 10.277 | 9.473 | 9.514 |
| Hardness (Non-IX)[1] | | | | |
| Hardness (IX'd)[2] | | | | |
| Refractive Index | | | 1.4956 | 1.4872 |

[1]Ion exchanged
[2]Not ion exchanged

TABLE 1c

Compositions of samples 10-21, which are based on base glass A.

| Composition (mol %) | Glass No. 10 | 11 | 12 | 13 | 14 |
|---|---|---|---|---|---|
| $SiO_2$ | 62.08 | 60.02 | 57.15 | 61.97 | 60.07 |
| $Al_2O_3$ | 14.87 | 14.79 | 14.81 | 14.95 | 14.95 |
| $Na_2O$ | 14.97 | 15.00 | 14.91 | 15.01 | 14.91 |
| $Fe_2O_3$ | 0.01 | 0.01 | 0.01 | 0.01 | 0.01 |
| $V_2O_5$ | 4.97 | 4.99 | 5.02 | 5.00 | 5.01 |
| $B_2O_3$ | 0.00 | 0.00 | 0.00 | 3.00 | 4.99 |
| $P_2O_5$ | 3.06 | 5.14 | 8.06 | 0.00 | 0.00 |

| Composition (mol %) | Glass No. 15 | 16 | 17 | 18 |
|---|---|---|---|---|
| $SiO_2$ | 57.10 | 62.57 | 64.61 | 62.53 |
| $Al_2O_3$ | 14.95 | 14.56 | 14.65 | 14.77 |
| $Na_2O$ | 14.88 | 14.88 | 14.79 | 14.74 |
| $Fe_2O_3$ | 0.01 | 0.01 | 0.01 | 0.01 |
| $V_2O_5$ | 5.03 | 2.95 | 2.96 | 2.92 |
| $B_2O_3$ | 7.98 | 0.00 | 0.00 | 4.99 |
| $P_2O_5$ | 0.00 | 4.99 | 2.93 | 0.00 |

| Composition (mol %) | Glass No. 19 | 20 | 21 |
|---|---|---|---|
| $SiO_2$ | 62.57 | 62.32 | 62.57 |
| $Al_2O_3$ | 14.85 | 14.90 | 14.85 |
| $Na_2O$ | 64.54 | 14.92 | 14.90 |
| $Fe_2O_3$ | 14.74 | 0.34 | 0.68 |
| $V_2O_5$ | 14.70 | 2.50 | 1.99 |
| $B_2O_3$ | 0.01 | 4.98 | 4.97 |
| $P_2O_5$ | 2.99 | 0.00 | 0.00 |

TABLE 1d

Properties of samples 10-21, which are based on base glass A.

| Properties | 10 | 11 | 12 | 13 | 14 |
|---|---|---|---|---|---|
| Anneal Pt. (° C.) | 586.8 | 563.6 | 526 | 553.3 | 529.3 |
| Strain Pt. (° C.) | 531.2 | 508.7 | 477.2 | 502.2 | 482.7 |
| Softening Pt. (° C.) | 825.1 | 819.4 | 768.5 | 816.6 | 787.4 |
| Glass color | black | black | black | black | black |
| CTE ($\times 10^{-7}$/° C.) | | | | | |
| Liquidus Temp (° C.) | 975 | 950 | 955 | 1030 | 1015 |
| Primary Devit Phase | Albite | Albite | Unknown | Unknown | Unknown |
| Liquidus Viscosity (Poise) | | | | | |
| Poisson's Ratio | 0.228 | 0.265 | 0.248 | 0.25 | 0.244 |
| Shear Modulus (Mpsi) | 3.677 | 3.578 | 3.517 | 3.665 | 3.577 |
| Young's Modulus (Mpsi) | 9.031 | 9.049 | 8.782 | 9.161 | 8.897 |
| Refractive Index | | | | | |
| $SOC^3$ (nm/cm/MPa) | | | | | |
| Color L* | | 26.1 | 27.92 | 26 | 25.76 |
| Color a* | | −0.13 | 0.8 | 0.01 | 0.03 |
| Color b* | | −4.88 | −2.3 | −0.76 | −0.81 |

| Properties | 15 | 16 | 17 | 18 | 19 |
|---|---|---|---|---|---|
| Anneal Pt. (° C.) | 508.8 | 593 | 619.8 | 583.4 | 606.7 |
| Strain Pt. (° C.) | 462.5 | 540.4 | 563.3 | 530.5 | 553.7 |
| Softening Pt. (° C.): | 751.1 | 877.1 | 912.2 | 852.9 | 889.4 |
| Glass color | black | brown | brown | brown | brown |
| CTE ($\times 10^{-7}$/° C.) | | | | | |
| Liquidus Temp (° C.) | | | | | |
| Primary Devit Phase | 1020 | >1250 | 965 | 870 | 880 |
| Liquidus Viscosity (Poise) | Unknown | Unknown | Albite | | |
| Poisson's Ratio | 0.246 | 0.247 | 0.221 | 0.252 | 0.21 |
| Shear Modulus (Mpsi) | 3.448 | 3.684 | 3.784 | 3.685 | 3.803 |
| Young's Modulus (Mpsi) | 8.589 | 9.19 | 9.242 | 9.225 | 9.204 |
| Refractive Index: | | | | | |
| SOC (nm/cm/MPa) | | | | | |
| Color L* | 26.68 | 24.5 | | 24.96 | 25.06 |
| Color a* | 0.05 | 0.19 | | 0.27 | 0.37 |
| Color b* | −0.97 | −1.01 | | −0.77 | −0.72 |

| Properties | 20 | 21 |
|---|---|---|
| Anneal Pt. (° C.) | 578.3 | 610.6 |
| Strain Pt. (° C.) | 527.4 | 555.2 |
| Softening Pt. (° C.): | 855.1 | 876.8 |
| Glass color | black | black |
| CTE ($\times 10^{-7}$/° C.) | | |
| Liquidus Temp (° C.) | <930 | 1035 |
| Primary Devit Phase | Unknown | Unknown |
| Liquidus Viscosity (Poise) | | |
| Poisson's Ratio | 0.245 | 0.234 |
| Shear Modulus (Mpsi) | 3.781 | 3.846 |
| Young's Modulus (Mpsi) | 9.413 | 9.489 |
| Refractive Index: | | |
| SOC (nm/cm/MPa) | | |
| Color L* | | 24.68 |
| Color a* | | 0.07 |
| Color b* | | −0.94 |

[3] Stress optical coefficient

TABLE 1e

Compositions and properties of samples 22-30, which are based on base glass A.

| | Glass No. | | | | |
|---|---|---|---|---|---|
| | 22 | 23 | 24 | 25 | 26 |
| Composition (mol %) | | | | | |
| $SiO_2$ | 66.51 | 67.51 | 65.51 | 65.51 | 66.51 |
| $Al_2O_3$ | 14.50 | 14.50 | 14.50 | 14.50 | 14.50 |
| $Na_2O$ | 14.95 | 14.96 | 14.95 | 14.96 | 14.96 |
| MgO | 0.00 | 0.00 | 2.01 | 0.00 | 1.01 |
| $Fe_2O_3$ | 0.03 | 0.03 | 0.03 | 0.03 | 0.03 |
| NiO | | | | | |
| $V_2O_5$ | 4.00 | 3.00 | 3.00 | 3.00 | 3.00 |
| $Co_3O_4$ | | | | | |
| $P_2O_5$ | | | | 2.00 | |
| CaO | | | | | |
| Properties | | | | | |
| Glass Color | | | | | |
| Liquidus Visc (kPoise) | | | | | |
| Color L* | 25.10 | 24.82 | 25.02 | 24.69 | 25.02 |
| Color a* | 0.11 | 0.49 | 1.06 | 0.34 | 0.46 |
| Color b* | −0.82 | −0.55 | −0.18 | −0.76 | −0.86 |

| | Glass No. | | | |
|---|---|---|---|---|
| | 27 | 28 | 29 | 30 |
| Composition (mol %) | | | | |
| $SiO_2$ | 67.01 | 59.83 | 59.53 | 59.28 |
| $Al_2O_3$ | 14.51 | 15.25 | 15.17 | 15.11 |
| $Na_2O$ | 14.95 | 15.67 | 15.59 | 15.52 |
| MgO | 0.00 | 2.86 | 2.85 | 2.84 |
| $Fe_2O_3$ | 0.03 | 0.36 | 0.72 | 0.36 |
| NiO | | 0.76 | 0.77 | 1.54 |
| $V_2O_5$ | 3.00 | | | |
| $Co_3O_4$ | | 0.24 | 0.36 | 0.36 |
| $P_2O_5$ | | 4.87 | 4.85 | 4.83 |
| CaO | 0.5 | | | |
| Properties | | | | |
| Glass Color | | | | |
| Liquidus Visc (kPoise) | | | | |
| Color L* | 24.82 | | | |
| Color a* | 0.41 | | | |

TABLE 1e-continued

Compositions and properties of samples 22-30, which are based on base glass A.

| Color b* | −0.68 |
|---|---|
| CaO | 24.82 |

TABLE 2a

Compositions of samples 31-39, which are based on base glass B.

| Composition (mol %) | Base Glass B | 31 | 32 | 33 | 34 |
|---|---|---|---|---|---|
| $SiO_2$ | 67.35 | 66.60 | 66.30 | 66.05 | 67.91 |
| $Al_2O_3$ | 12.66 | 12.53 | 12.47 | 12.42 | 12.77 |
| MgO | 2.36 | 2.34 | 2.32 | 2.31 | 0.00 |
| $Na_2O$ | 13.73 | 13.50 | 13.44 | 13.39 | 13.76 |
| $B_2O_3$ | 3.73 | 3.62 | 3.60 | 3.59 | 3.69 |
| $Fe_2O_3$ | | 0.33 | 0.67 | 0.33 | 0.68 |
| $Co_3O_4$ | | 0.22 | 0.33 | 0.33 | 0.34 |
| NiO | | 0.71 | 0.72 | 1.43 | 0.72 |
| $SnO_2$ | 0.09 | 0.09 | 0.08 | 0.08 | 0.09 |

| Composition (mol %) | 35 | 36 | 37 | 38 | 39 |
|---|---|---|---|---|---|
| $SiO_2$ | 67.44 | 66.98 | 67.65 | 67.19 | 66.73 |
| $Al_2O_3$ | 12.69 | 12.60 | 12.72 | 12.64 | 12.55 |
| MgO | 0.67 | 1.33 | 0.00 | 0.67 | 1.33 |
| $Na_2O$ | 13.67 | 13.58 | 13.71 | 13.62 | 13.53 |
| $B_2O_3$ | 3.67 | 3.65 | 3.68 | 3.65 | 3.63 |
| $Fe_2O_3$ | 0.67 | 0.67 | 0.34 | 0.34 | 0.34 |
| $Co_3O_4$ | 0.34 | 0.33 | 0.34 | 0.33 | 0.33 |
| NiO | 0.72 | 0.72 | 1.44 | 1.44 | 1.43 |
| $SnO_2$ | 0.09 | 0.08 | 0.09 | 0.09 | 0.08 |

TABLE 2b

Properties of samples 31-39, which are based on base glass B.

| Properties | Base Glass B | 31 | 32 | 33 | 34 |
|---|---|---|---|---|---|
| Anneal Pt. (° C.) | 631 | | | | |
| Strain Pt. (° C.) | 578 | | | | |
| Softening Pt. (° C.): | 903 | | | | |
| Glass color | T | Black | Black | Black | Black |
| Density (g/cm³) | 2.394 | | | | |
| CTE (×10⁻⁷/° C.) | 75.4 | | | | |
| Liquidus Temp (° C.) | 1005 | 1190 | 1265 | 1200 | 1190 |
| Primary Devit Phase | Forsterite | Forsterite-like | Forsterite-like | Forsterite-like | Spinel-like |
| Liquidus Viscosity (Poise) | $2.2 \times 10^6$ | $4.1 \times 10^4$ | $1.3 \times 10^4$ | $2.9 \times 10^4$ | $7.8 \times 10^4$ |
| Poisson's Ratio | 0.2 | | | | |
| Shear Modulus (Mpsi): | 4.157 | | | | |
| Young's Modulus (Mpsi) | 9.975 | | | | |
| Refractive Index | 1.496 | | | | |
| SOC (nm/cm/MPa) | 32.2 | | | | |
| Color L* | | 24.05 | 24.09 | 24.09 | 24.09 |
| Color a* | | 0.06 | 0.07 | 0.07 | 0.05 |
| Color b* | | −0.67 | −0.67 | −0.66 | −0.72 |

| Properties | 35 | 36 | 37 | 38 | 39 |
|---|---|---|---|---|---|
| Anneal Pt. (° C.) | | | | | |
| Strain Pt. (° C.) | | | | | |
| Softening Pt. (° C.): | | | | | |
| Glass color | Black | Black | Black | Black | Black |
| Density (g/cm³) | | | | | |
| CTE (×10⁻⁷/° C.) | | | | | |
| Liquidus Temp (° C.) | 1175 | 1165 | | | |
| Primary Devit Phase | Spinel-like | Ni—Mg-Forsterite | Patty-NiO | Patty-NiO | Patty-NiO |
| Liquidus Viscosity (Poise) | $6.6 * 10^4$ | $7.9 * 10^4$ | XRD | XRD | XRD |
| Poisson's Ratio | | | | | |
| Shear Modulus (Mpsi): | | | | | |
| Young's Modulus (Mpsi): | | | | | |
| Refractive Index: | | | | | |
| SOC (nm/cm/MPa): | | | | | |
| Color L* | 24.06 | 24.11 | 24.39 | 24.25 | 24.23 |
| Color a* | 0.01 | 0.08 | 0.13 | 0.16 | 0.17 |
| Color b* | −0.71 | −0.64 | −1.97 | −0.79 | −0.71 |

TABLE 3a

Compositions of samples 40-57, which are based on base glass C.

| Composition (mol %) | Base Glass C | 40 | 41 | 42 | 43 |
|---|---|---|---|---|---|
| $SiO_2$ | 64.76 | 64.07 | 64.15 | 63.55 | 63.63 |
| $Al_2O_3$ | 13.94 | 13.77 | 13.78 | 13.66 | 13.68 |
| MgO | 2.36 | 2.42 | 2.41 | 2.40 | 2.40 |
| $Na_2O$ | 13.82 | 13.65 | 13.66 | 13.53 | 13.56 |
| $B_2O_3$ | 5 | 5.09 | 5.10 | 5.05 | 5.06 |
| $Fe_2O_3$ | | 0.00 | 0.00 | 0.00 | 0.00 |
| $Co_3O_4$ | | 0.11 | 0.11 | 0.22 | 0.33 |
| $MnO_2$ | | 0.61 | 0.61 | 1.20 | 1.20 |
| NiO | | 0.00 | 0.00 | 0.00 | 0.00 |
| $Cr_2O_3$ | | 0.13 | 0.13 | 0.26 | 0.00 |
| $SnO_2$ | 0.08 | 0.09 | 0.00 | 0.08 | 0.08 |

| Composition (mol %) | 44 | 45 | 46 | 47 | 48 |
|---|---|---|---|---|---|
| $SiO_2$ | 63.90 | 64.10 | 63.85 | 63.90 | 63.94 |
| $Al_2O_3$ | 13.74 | 13.78 | 13.72 | 13.74 | 13.74 |
| MgO | 2.41 | 2.41 | 2.40 | 2.41 | 2.40 |
| $Na_2O$ | 13.61 | 13.66 | 13.60 | 13.61 | 13.62 |
| $B_2O_3$ | 5.08 | 5.10 | 5.07 | 5.08 | 5.08 |
| $Fe_2O_3$ | 0.41 | 0.00 | 0.00 | 0.41 | 0.41 |

TABLE 3a-continued

Compositions of samples 40-57, which are based on base glass C.

| | | | | | |
|---|---|---|---|---|---|
| Co₃O₄ | 0.11 | 0.11 | 0.16 | 0.11 | 0.00 |
| MnO₂ | 0.60 | 0.00 | 0.00 | 0.60 | 0.75 |
| NiO | 0.00 | 0.70 | 1.05 | 0.00 | 0.00 |
| Cr₂O₃ | 0.00 | 0.00 | 0.00 | 0.00 | 0.00 |
| SnO₂ | 0.09 | 0.09 | 0.09 | 0.09 | 0.00 |

| Composition (mol %) | Base Glass C | Glass No. 49 | 50 | 51 | 52 |
|---|---|---|---|---|---|
| SiO₂ | 64.76 | 64.00 | 64.07 | 63.38 | 63.86 |
| Al₂O₃ | 13.94 | 13.76 | 13.77 | 13.62 | 13.73 |
| MgO | 2.36 | 2.41 | 2.41 | 2.39 | 2.41 |
| Na₂O | 13.82 | 13.64 | 13.65 | 13.50 | 13.60 |
| B₂O₃ | 5 | 5.09 | 5.09 | 5.04 | 5.08 |
| Fe₂O₃ | | 0.00 | 0.00 | 0.00 | 0.68 |
| Co₃O₄ | | 0.11 | 0.11 | 0.22 | 0.22 |
| NiO | | 0.71 | 0.71 | 1.43 | 0.00 |
| Cr₂O₃ | | 0.13 | 0.13 | 0.26 | 0.27 |
| CuO | | 0.00 | 0.00 | 0.00 | 0.00 |
| SnO₂ | 0.08 | 0.09 | 0.00 | 0.08 | 0.09 |

| Composition (mol %) | Glass No. 53 | 54 | 55 | 56 | 57 |
|---|---|---|---|---|---|
| SiO₂ | 63.81 | 62.98 | 63.50 | 63.26 | 63.43 |
| Al₂O₃ | 13.71 | 13.53 | 13.65 | 13.60 | 13.63 |
| MgO | 2.39 | 2.36 | 2.40 | 2.39 | 2.39 |
| Na₂O | 13.59 | 13.41 | 13.53 | 13.48 | 13.50 |
| B₂O₃ | 5.07 | 5.00 | 5.05 | 5.03 | 5.04 |
| Fe₂O₃ | 0.34 | 0.51 | 0.68 | 0.34 | 0.42 |
| Co₃O₄ | 0.22 | 0.34 | 0.34 | 0.34 | 0.28 |
| NiO | 0.72 | 0.72 | 0.72 | 1.44 | 0.90 |
| Cr₂O₃ | 0.00 | 0.00 | 0.00 | 0.00 | 0.27 |
| CuO | 0.00 | 1.02 | 0.04 | 0.04 | 0.04 |
| SnO₂ | 0.09 | 0.09 | 0.09 | 0.08 | 0.09 |

TABLE 3b

Compositions of samples 40-57, which are based on base glass C.

| Properties | Base Glass C | 40 | 41 | 42 | 43 |
|---|---|---|---|---|---|
| Anneal Pt. (° C.) | 625 | | | | |
| Strain Pt. (° C.) | 572 | | | | |
| Softening Pt. (° C.): | 895 | | | | |
| Glass color | T | Black | Black | Green Black | Black |
| Density (g/cm³) | 2.396 | | | | |
| CTE (×10⁻⁷/° C.) | 75.0 | | | | |
| Liquidus Temp (° C.) | 1000 | | | | |
| Primary Devit Phase | Nepheline | | | | |
| Liquidus Viscosity (Poise) | 2.4 * 10⁶ | | | | |
| Poisson's Ratio | 0.17 | | | | |
| Shear Modulus (Mpsi): | 4.05 | | | | |
| Young's Modulus (Mpsi): | 9.46 | | | | |
| Refractive Index: | 1.497 | | | | |
| SOC (nm/cm/MPa): | 32.7 | | | | |
| Color L* | | | 24.53 | 24.66 | 30.94 |
| Color a* | | | −1.18 | −0.94 | −3.06 |
| Color b* | | | −0.45 | −0.28 | −8.24 |

| Properties | 44 | 45 | 46 | 47 | 48 |
|---|---|---|---|---|---|
| Anneal Pt. (° C.) | | | | | |
| Strain Pt. (° C.) | | | | | |
| Softening Pt. (° C.): | | | | | |
| Glass color | Black | Black | Black | Black | Dark Brown |
| Density (g/cm³) | | | | | |
| CTE (×10⁻⁷/° C.) | | | | | |
| Liquidus Temp (° C.) | | | | | |
| Primary Devit Phase | | | | | |
| Liquidus Viscosity (Poise) | | | | | |
| Poisson's Ratio | | | | | |
| Shear Modulus (Mpsi): | | | | | |
| Young's Modulus (Mpsi): | | | | | |
| Refractive Index: | | | | | |
| SOC (nm/cm/MPa): | | | | | |
| Color L* | | 25.45 | | | |
| Color a* | | −1.14 | | | |
| Color b* | | −0.43 | | | |

| Properties | Base Glass C | 49 | 50 | 51 | 52 |
|---|---|---|---|---|---|
| Anneal Pt. (° C.) | 625 | | | | |
| Strain Pt. (° C.) | 572 | | | | |
| Softening Pt. (° C.) | 895 | | | | |
| Glass color | Transparent | Black | Black | Green | Blue Green |
| Density (g/cm³) | 2.396 | | | | |
| CTE (×10⁻⁷/° C.) | 75.0 | | | | |
| Liquidus Temp (° C.) | 1000 | 1075 | 1140 | 1120 | |
| Primary Devit Phase | Nepheline | | | | |
| Liquidus Viscosity (Poise) | 2.4 * 10⁶ | 4.5 × 10⁵ | 8.8 × 10⁴ | 1.0 × 10⁵ | |
| Poisson's Ratio | 0.17 | 0.17 | | | |
| Shear Modulus (Mpsi): | 4.05 | 4.05 | | | |
| Young's Modulus (Mpsi): | 9.46 | 9.46 | | | |
| Refractive Index | 1.497 | 1.497 | | | |

TABLE 3b-continued

Compositions of samples 40-57, which are based on base glass C.

| | | |
|---|---|---|
| SOC (nm/cm/MPa) | 32.7 | 32.7 |
| Color L* | | 29.62 | 29.17 |
| Color a* | | −5.02 | −4.45 |
| Color b* | | 3.13 | 1.21 |

| Properties | 53 | 54 | 55 | 56 | 57 |
|---|---|---|---|---|---|
| Anneal Pt. (° C.) | 625 | | | | |
| Strain Pt. (° C.) | 572 | | | | |
| Softening Pt. (° C.) | 895 | | | | |
| Glass color | Transparent | Black | Brown Black | Black | Black |
| Density (g/cm³) | 2.396 | | | | |
| CTE (×10⁻⁷/° C.) | 75.0 | | | | |
| Liquidus Temp (° C.) | 1000 | | | | |
| Primary Devit Phase | Nepheline | | | | |
| Liquidus Viscosity (Poise) | 2.4 * 10⁶ | | | | |
| Poisson's Ratio | 0.17 | | | | |
| Shear Modulus (Mpsi): | 4.05 | | | | |
| Young's Modulus (Mpsi): | 9.46 | | | | |
| Refractive Index | 1.497 | | | | |
| SOC (nm/cm/MPa) | 32.7 | | | | |
| Color L* | | 24.36 | | 24.17 | 24.17 |
| Color a* | | −0.48 | | −0.23 | −0.22 |
| Color b* | | −1.01 | | −0.95 | −0.95 |

TABLE 4

Compositions and properties of samples 58-60, which are based on base glass D.

| | Glass No. | | | |
|---|---|---|---|---|
| Composition (mol %) | Base Glass D | 58 | 59 | 60 |
| SiO₂ | 60.69 | 59.83 | 59.53 | 59.12 |
| Al₂O₃ | 15.44 | 15.25 | 15.17 | 15.07 |
| MgO | 2.90 | 2.86 | 2.85 | 2.83 |
| Na₂O | 15.86 | 15.67 | 15.59 | 15.48 |
| P2O5 | 4.94 | 4.87 | 4.85 | 4.82 |
| CaO | 0.05 | 0.05 | 0.05 | 0.05 |
| Fe₂O₃ | | 0.36 | 0.72 | 0.36 |
| Co₃O₄ | | 0.24 | 0.36 | 0.35 |
| NiO | | 0.76 | 0.77 | 1.54 |
| Cr₂O₃ | | 0.00 | 0.00 | 0.28 |
| SnO₂ | 0.08 | 0.11 | 0.11 | 0.11 |
| Properties | 5318-Base | | | |
| Anneal Pt. (° C.) | 625 | | | |
| Strain Pt. (° C.) | 572 | | | |
| Softening Pt. (° C.) | 895 | | | |
| Glass color | T | Black | Black | Black |
| Density (g/cm³) | 2.396 | | | |
| CTE (×10⁻⁷/° C.) | 75.0 | | | |
| Liquidus Temp (° C.) | 1000 | 1075 | 1140 | 1120 |
| Primary Devit Phase | Nepheline | Unknown | Unknown | Unknown |
| Liquidus Viscosity (Poise) | 2.4 × 10⁶ | 4.5 × 10⁵ | 8.8 × 10⁴ | 1.0 × 10⁵ |

TABLE 4-continued

Compositions and properties of samples 58-60, which are based on base glass D.

| | Glass No. | | | |
|---|---|---|---|---|
| Composition (mol %) | Base Glass D | 58 | 59 | 60 |
| Poisson's Ratio | 0.17 | | | |
| Shear Modulus (Mpsi): | 4.05 | | | |
| Young's Modulus (Mpsi): | 9.46 | | | |
| Refractive Index | 1.497 | | | |
| SOC (nm/cm/MPa) | 32.7 | | | |
| Color L* | | 24.43 | 24.27 | 24.24 |
| Color a* | | 0.92 | 0.16 | 0.15 |
| Color b* | | −4.41 | −0.96 | −0.94 |

TABLE 5

Ion exchange properties of transparent glasses listed in Table 1a.

| Sample | Oxide added to Base Glass | CS (MPa) (2 h) | CS (MPa) (4 h) | CS (MPa) (6 h) | DOL (μm) (2 h) | DOL (μm) (4 h) | DOL (μm) (6 h) |
|---|---|---|---|---|---|---|---|
| 1 | MgO | | 1131 | 1119 | | 36.2 | 41.9 |
| 3 | MnO₂ | 1063 | | | 34 | | |
| 8 | B₂O₃ | 904 | 875 | 874 | 33.6 | 45.4 | 53.5 |
| 9 | P₂O₅ | 760 | 731 | 723 | 62.8 | 86.1 | 99.7 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A silicate glass, the silicate glass having a Vickers crack initiation threshold of greater than 25 kgf and comprising:
   at least about 50 mol % $SiO_2$;
   at least about 10 mol % $Na_2O$;
   $Al_2O_3$, wherein −0.5 mol % $Al_2O_3$ (mol %)-$Na_2O$ (mol %) 2 mol %;
   $B_2O_3$, wherein (i) $B_2O_3 \leq 8.0$ mol %, and (ii) $B_2O_3$ (mol %)−($Na_2O$ (mol %)−$Al_2O_3$ (mol %)) 4.5 mol %; and
   at least 0.11 mol % of at least one transition metal oxide colorant, the transition metal oxide colorant comprising at least one of $V_2O_5$, NiO, CuO, $Cr_2O_3$, $MnO_2$, $Fe_2O_3$, and $Co_3O_4$;
   wherein the silicate glass is black and exhibits color coordinates:
   L*: 24 to 30;
   a*: −4.5 to 0.5; and
   b*: −1.1 to 1.3; and
   wherein the silicate glass exhibits a transmission of less than 1% at each wavelength in the range of from 400 nm to 770 nm.

2. The silicate glass of claim 1, wherein the silicate glass has a Vickers crack initiation threshold of at least 30 kgf.

3. The silicate glass of claim 1, wherein the silicate glass has a layer under a compressive stress of at least about 600 MPa, the layer extending from a surface of the silicate glass into the silicate glass to a depth of layer of at least about 30 μm.

4. The silicate glass of claim 1, wherein the silicate glass comprises from about 60 mol % to about 66 mol % $SiO_2$.

5. The silicate glass of claim 1, wherein the silicate glass comprises at least about 0.1 mol % of at least one of MgO and ZnO.

6. The silicate glass of claim 1, wherein the silicate glass comprises greater than 4.5 mol % $B_2O_3$ in which boron cations are three-fold coordinated.

7. The silicate glass of claim 1, wherein the silicate glass comprises:
from about 12 mol % to about 22 mol % $Al_2O_3$;
from about 10 mol % to about 20 mol % $Na_2O$;
from 0 mol % to about 5 mol % $K_2O$;
0 mol % ≤ MgO ≤ 6 mol %; and
0 mol % ≤ ZnO ≤ 6 mol %.

8. The silicate glass of claim 1, wherein:
0 mol % ≤ $V_2O_5$ ≤ 6 mol %,
0 mol % ≤ NiO ≤ 6 mol %,
0 mol % ≤ CuO ≤ 6 mol %,
0 mol % ≤ $Cr_2O_3$ ≤ 6 mol %,
0 mol % ≤ $MnO_2$ ≤ 6 mol %,
0 mol % ≤ $Fe_2O_3$ ≤ 6 mol %, and
0 mol % ≤ $Co_3O_4$ ≤ 6 mol %.

9. The silicate glass of claim 1, wherein the silicate glass is opaque.

10. The silicate glass of claim 1, wherein the silicate glass has a thickness of about 1 mm and a transmission of less than 1% at wavelengths in a range from about 380 nm to about 770 nm.

11. The silicate glass of claim 10, wherein the transmission is 0%.

12. The silicate glass of claim 1, wherein the silicate glass forms at least a portion of a cover plate, a touch screen, a watch crystal, a solar concentrator, a window, a screen, or a container.

13. The silicate glass of claim 1, wherein the silicate glass has a Vickers crack initiation threshold of at least 35 kgf.

14. The silicate glass of claim 1, wherein the silicate glass comprises 4.97 mol % to 8 mol % $B_2O_3$.

15. A silicate glass, the silicate glass having a Vickers crack initiation threshold of greater than 25 kgf, the silicate glass comprising:
at least about 50 mol % $SiO_2$;
at least 10 mol % $Na_2O$;
0 mol % $K_2O$;
$Al_2O_3$, wherein $Al_2O_3$ (mol %)<$Na_2O$ (mol %);
2.90 mol % to 5.00 mol % $B_2O_3$, wherein $B_2O_3$ (mol %)−($Na_2O$ (mol %)−$Al_2O_3$ (mol %)) 2 mol %; and
at least 0.11 mol % of at least one transition metal oxide colorant, the transition metal oxide colorant comprising at least one of $V_2O_5$, NiO, CuO, $Cr_2O_3$, $MnO_2$, $Fe_2O_3$, and $Co_3O_4$; and
wherein the silicate glass ac and exhibits color coordinates:
L*: 24 to 26.1;
a*: 0 to 0.20; and
b*: −2.0 to −0.5; and
wherein the silicate glass exhibits a transmission of less than 1% at each wavelength in the range of from 400 nm to 770 nm.

16. The silicate glass of claim 15, wherein the Vickers crack initiation threshold is at least 30 kgf.

17. The silicate glass of claim 15, wherein the silicate glass comprises from about 3 mol % to about 4.5 mol % $B_2O_3$ in which boron cations are three-fold coordinated.

18. The silicate glass of claim 15, wherein $B_2O_3$ (mol %)−($Na_2O$ (mol %)−$Al_2O_3$ (mol %)) 4.5 mol %.

19. The silicate glass of claim 15, wherein the silicate glass comprises from about 66 mol % to about 74 mol % $SiO_2$,
wherein the silicate glass exhibits color coordinates:
L*: 24 to 25;
a*: 0 to 0.20; and
b*: −2.0 to −0.5.

20. The silicate glass of claim 15, wherein the silicate glass comprises at least about 0.1 mol % of at least one of MgO and ZnO,
wherein the silicate glass exhibits color coordinates:
L*: 24 to 25;
a*: 0 to 0.20; and
b*: −2.0 to −0.5.

21. The silicate glass of claim 15, wherein the glass comprises:
from about 9 mol % to about 22 mol % $Al_2O_3$;
0 mol % ≤ MgO ≤ 6 mol %; and
0 mol % ≤ ZnO ≤ 6 mol %.

22. The silicate glass of claim 15, wherein the silicate glass contains less than about one inclusion per kilogram of silicate glass, the inclusion having a diameter of at least 50 μm.

23. The silicate glass of claim 22, wherein the silicate glass comprises:
0 mol % ≤ $V_2O_5$ ≤ 6 mol %,
0 mol % ≤ NiO ≤ 6 mol %,
0 mol % ≤ CuO ≤ 6 mol %,
0 mol % ≤ $Cr_2O_3$ ≤ 6 mol %,
0 mol % ≤ $MnO_2$ ≤ 6 mol %,
0 mol % ≤ $Fe_2O_3$ ≤ 6 mol %, and
0 mol % ≤ $Co_3O_4$ ≤ 6 mol %.

24. The silicate glass of claim 15, wherein the silicate glass forms at least a portion of a cover plate, a touch screen, a watch crystal, a solar concentrator, a window, a screen, or a container.

25. The silicate glass of claim 15, wherein the silicate glass is opaque.

26. The silicate glass of claim 15, wherein the silicate glass has a thickness of about 1 mm and a transmission of less than 1% at wavelengths in a range from about 380 nm to about 770 nm.

27. The silicate glass of claim 26, wherein the transmission is 0%.

28. The silicate glass of claim 15, wherein the silicate glass has a Vickers crack initiation threshold of at least 35 kgf.

* * * * *

UNITED STATES PATENT AND TRADEMARK OFFICE
CERTIFICATE OF CORRECTION

| | |
|---|---|
| PATENT NO. | : 11,926,564 B2 |
| APPLICATION NO. | : 14/764786 |
| DATED | : March 12, 2024 |
| INVENTOR(S) | : Xiaoju Guo et al. |

It is certified that error appears in the above-identified patent and that said Letters Patent is hereby corrected as shown below:

In the Claims

In Column 18, Line 43, in Claim 1, delete "mol %" and insert -- mol %$\leq$ --.

In Column 18, Line 44, in Claim 1, delete "%)" and insert -- %)$\leq$ --.

In Column 18, Line 46, in Claim 1, delete "(mol %))" and insert -- (mol %))$\geq$ --.

In Column 20, Line 7, in Claim 18, delete "(mol %))" and insert -- (mol %))$\leq$ --.

Signed and Sealed this
Ninth Day of July, 2024

Katherine Kelly Vidal
*Director of the United States Patent and Trademark Office*